US009523228B2

(12) United States Patent
Krammer et al.

(10) Patent No.: US 9,523,228 B2
(45) Date of Patent: Dec. 20, 2016

(54) DAMPING DEVICE FOR FURNITURE COMPONENTS OR FURNITURE FITTING COMPONENTS

(75) Inventors: Bernhard Krammer, Höchst (AU); Andreas Holzapfel, Bregenz (AU)

(73) Assignee: Julius Blum GmbH, Hochst (AT)

( * ) Notice: Subject to any disclaimer, the term of this patent is extended or adjusted under 35 U.S.C. 154(b) by 1317 days.

(21) Appl. No.: 12/947,105

(22) Filed: Nov. 16, 2010

(65) Prior Publication Data

US 2011/0067964 A1 Mar. 24, 2011

Related U.S. Application Data

(63) Continuation of application No. PCT/AT2009/000205, filed on May 19, 2009.

(30) Foreign Application Priority Data

May 19, 2008 (AT) .................................. A 790/2008

(51) Int. Cl.

*F16D 57/00* (2006.01)
*E05F 3/14* (2006.01)
*E05F 5/00* (2006.01)
*E05F 5/04* (2006.01)

(52) U.S. Cl.

CPC ................. *E05F 3/14* (2013.01); *E05F 5/006* (2013.01); *E05F 5/04* (2013.01); *E05F 2005/046* (2013.01); *E05Y 2201/214* (2013.01); *E05Y 2201/216* (2013.01); *E05Y 2201/22* (2013.01); *E05Y 2201/244* (2013.01); *E05Y 2201/474* (2013.01); *E05Y 2900/20* (2013.01)

(58) Field of Classification Search

CPC ................ E05F 3/14; E05F 5/006; E05F 5/04; E05F 2005/046; E05Y 2201/214; E05Y 2201/216; E05Y 2201/22; E05Y 2201/244; F16D 57/00; F16F 9/12; F16F 9/14

USPC ................................ 188/290, 291, 300, 266

See application file for complete search history.

(56) References Cited

U.S. PATENT DOCUMENTS 6,666,306 B2 * 12/2003 Gasser ......................... 188/82.1
2002/0096405 A1 7/2002 Gasser
2004/0144604 A1 7/2004 Doornbos et al.

FOREIGN PATENT DOCUMENTS

| | | |
|---|---|---|
| AU | 5479 | 7/2002 |
| DE | 44 42 547 | 6/1996 |
| DE | 201 07 068 | 8/2001 |
| EP | 1 739 261 | 1/2007 |
| JP | 9-203264 | 8/1997 |

(Continued)

OTHER PUBLICATIONS

International Search Report issued Sep. 11, 2009 in International (PCT) Application No. PCT/AT2009/000205.

(Continued)

*Primary Examiner* — Thomas J Williams
*Assistant Examiner* — Vu Q Nguyen
(74) *Attorney, Agent, or Firm* — Wenderoth, Lind & Ponack, L.L.P.

(57) ABSTRACT

A damping device with damper is arranged on a first part of a piece of furniture or furniture fitting, operable by a second part of a piece of furniture or furniture fitting thus damping a relative movement of both parts. The damping effect of the damper may be deactivated by a switchable coupling switched by a preferably manually operated switch body.

17 Claims, 7 Drawing Sheets

(56) References Cited

FOREIGN PATENT DOCUMENTS

| | | |
|---|---|---|
| WO | 2008/135155 | 11/2008 |

OTHER PUBLICATIONS

Austrian Patent Office Search Report completed Mar. 23, 2009 in Austrian Patent Application No. A 790/2008 corresponding to the present U.S. application.

* cited by examiner

DAMPING DEVICE FOR FURNITURE COMPONENTS OR FURNITURE FITTING COMPONENTS

This application is a Continuation of International application No. PCT/AT2009/000205, filed May 19, 2009, the entire disclosure of which is incorporated herein by reference.

BACKGROUND OF THE INVENTION

The present invention relates to a damping device comprising a damper which is arranged at a first part of an article of furniture or furniture fitting (collectively, an article of furniture) and which is actuated by a second part of an article of furniture or furniture fitting and in that case damps a relative movement of the two parts.

Moreover, the invention concerns a furniture hinge, a pull-out-guide assembly for drawers, and an actuating mechanism for moving a furniture flap having a damping device of the kind to be described.

It is known in the state of the art for articles of furniture or furniture fittings to be provided with a damping device so that a damped movement of the movable furniture part or the furniture fitting into at least one end position can take place. In that case, an actuating element associated with the damping device is acted upon by an abutment portion or by the movable furniture part itself, as from a given relative position of the furniture fitting, and that initiates the beginning of the damping process. However, when using furniture fittings with integrated damping function, the furniture part to be moved can be braked excessively so that the resulting closing and opening time of the movable furniture part exceeds a tolerable magnitude. In the extreme case, it is even possible that no complete movement at all of the movable furniture part is possible, to the desired end position.

It is therefore an object of the present invention to provide a damping device of the general kind set forth in the opening part of this specification, while avoiding the aforementioned disadvantage.

SUMMARY OF THE INVENTION

According to the invention, that object is achieved in that the damping device has a coupling which can be switched by way of a—preferably manually actuable—switching member and by way of which the damping action of the damper can be deactivated.

By virtue of a—preferably manual—actuation of the switching member, the damper in a first switching position of the switching member of the switchable coupling can damp a relative movement of the two parts of the article of furniture or of the furniture fitting. However, in a second switching position of the switching member of the switchable coupling, the damper does not exert any damping action on the two parts of the article of furniture or the furniture fitting.

The switching member of the switchable coupling therefore enables the user to decide whether the damper should generate a damping action or not. The switching member couples and uncouples the coupling and therefore determines whether the flow of force introduced into the damping device is to be cut or to be connected, if desired. It is therefore preferably provided that the damper damps the relative movement of the two parts when the coupling is closed, and the damping action is deactivated when the coupling is open.

In principle two different variants can be embodied. In a first variant of the invention, the first part of the article of furniture or furniture fitting can act on the damper by way of a movable actuating element, wherein the switchable coupling is arranged between the actuating element and the damper. The actuating element is motionally coupled to the damper in a first switching position of the switchable coupling, and the actuating element is freely movable independently of the damper in a second switching position of the switchable coupling. In other words, transmission of the flow of force to the damper can be interrupted from the outset by such an arrangement of the switchable coupling between the actuating element and the damper.

In a second variant of the invention, the damper has two damping components which are mounted movably relative to each other in a damping stroke. The switchable coupling arrests one of the two damping components in a first switching position of the switching member so that, in the damping stroke (i.e., in a damping direction of movement) a relative movement takes place between the two damping components and thus a damping action of the damping device is provided. On the other hand, the switchable coupling releases the damping component in a second switching position of the switching member so that in the damping stroke (i.e., in the same damping direction of movement) no relative movement of the two damping components takes place and thus there is no damping action provided by the damping device. In other words, one of the two damping components can be arrested by a coupling in the switched-on condition, in which case the other damping component can rotate in the damping stroke relative to the first damping component which is arrested in that fashion. Arranged between the two damping components is a preferably viscous damping fluid. Upon a relative movement of the two damping components, shearing forces act on that damping fluid and cause the damping action. In the disengaged condition of the switchable coupling, in contrast, the two damping components remain in their relative position with respect to each other, and no shearing forces act on the damping medium arranged between the damping components, whereby also no damping action is generated.

The switchable coupling can be in the form of a force-locking coupling device which can be user-operated by the switching member. In that respect it may be desirable if the switchable coupling comprises a plurality of coupling elements, by which a clamping connection can be made between one of the damping components and a holding portion in the first switching position of the switching member. In the second switching position of the switching member, the coupling elements are movable into a position in which the damping component does not couple to the holding portion.

In a preferred embodiment, the holding portion can be formed by the damper housing, by a central projection or by another—preferably stationary—structure of the damping device.

The coupling elements are therefore operative between the holding portion and one of the damping components, wherein the coupling elements—depending on the respective switching position of the switching member—either produce a clamping connection between the holding portion and one of the damping components or in the other case allow a relative movement between the damping component and the holding portion.

The furniture fitting with the damping device according to the invention can either be in the form of a furniture hinge, a pull-out-guide assembly for drawers or in the form of an actuating mechanism for moving a furniture flap. In that case, the damping device in question can be arranged so that it damps a relative movement—in particular a linear movement and/or a pivotal movement—of at least two abutment portions to be fixed to a furniture part. In that respect, in the case of furniture hinges, the relative movement of a hinge cup with respect to a hinge arm can be damped. In the case of a pull-out-guide assembly for drawers, the relative movement of two rails can be dampened and in the case of an actuating mechanism, the pivotal movement of an actuating arm provided for moving the furniture flap can be dampened. For reasons of simplicity the arrangement of a damping device on a furniture hinge is shown in the accompanying drawings. On the basis of the illustrated embodiments the person skilled in the art will directly see how the arrangement of the damping device is to be implemented on a pull-out-guide assembly for drawers or on an actuating mechanism for moving a furniture flap.

BRIEF DESCRIPTION OF THE DRAWINGS

Further details and advantages of the present invention will be described with reference to the specific description hereinafter, wherein.

DETAILED DESCRIPTION OF THE INVENTION

The fundamental essence of the invention will now be described with reference to the highly diagrammatic views in FIGS. 1*a* and 1*b* through FIGS. 6*a* and 6*b:*

Figure 1A:
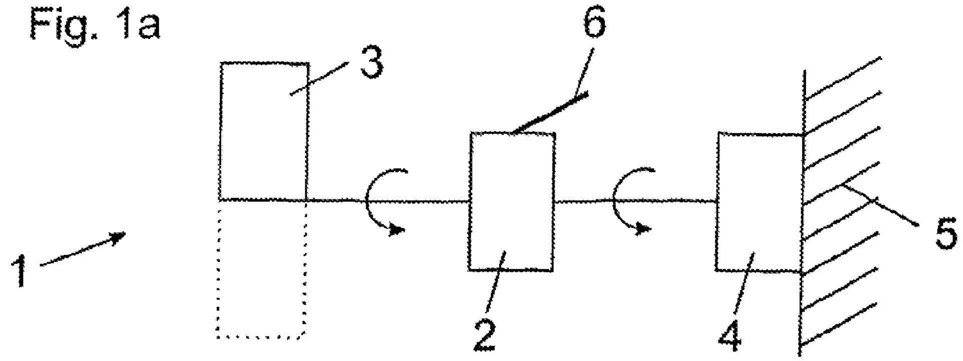
FIGS. 1*a*, 1*b* show highly schematic views of a switchable coupling in two different switching positions, the switchable coupling being operative between the actuating element of the damper and the actual damper.
Figure 1B:
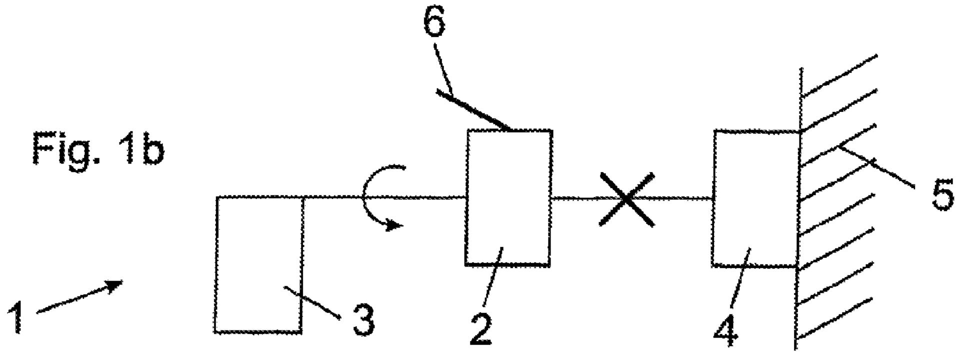

FIG. 1*a* and FIG. 1*b* show the arrangement of a damping device 1 having a switchable coupling 2 being operative between an actuating element 3 and the actual damper 4. The damper 4 is mounted to a structure 5 which, for example, is a furniture part or a part of a furniture fitting. The switchable coupling 2 comprises a manually actuable switching member 6 which in FIG. 1*a* is in a switching position which produces a dampened movement of the actuating element 3. When the actuating element 3 of the damper 4 is acted upon by a force, the actuating element 3 can be moved into the position shown in dotted line, which is clearly indicated by the arrow shown between the actuating element 3 and the switchable coupling 2. As the switching member 6 of the switchable coupling 2 is in a first switching position, the flow of force applied by the actuating element 3 is also transmitted to the actual damper 4 (arrow between switchable coupling 2 and damper 4), whereby the movement of the actuating element 3 (and therewith the movement of a furniture part or a furniture fitting) is also dampened.

FIG. 1*b* in contrast shows the switching member 6 of the switchable coupling 2 in a second switching position. In that switching position of the switching member 6, a movement of the actuating element 3 (arrow between actuating element 3 and switchable coupling 2) is not transmitted at all to the actual damper 4. The actuating element 3 can admittedly move freely within predetermined limits independently of the damper 4, but that movement is not damped by the damper 4. The interrupted flow of force between the switchable coupling 2 and the damper 4 is symbolically indicated by the illustrated cross.

Figure 2A:
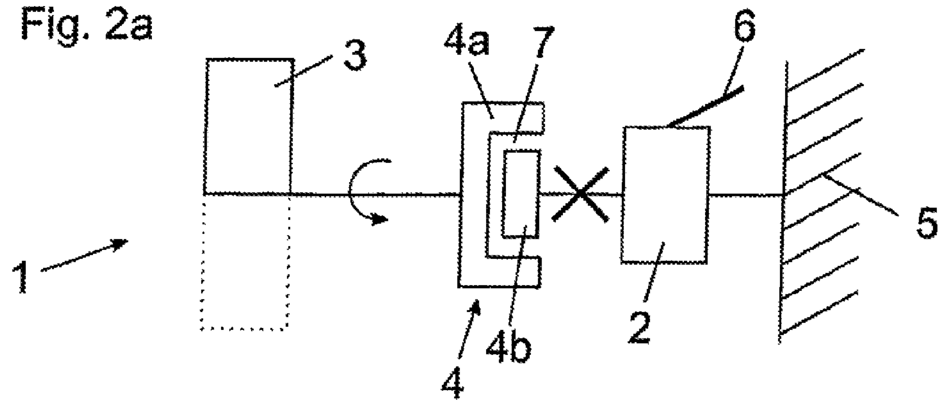
FIGS. 2*a*, 2*b* show highly diagrammatic views of a switchable coupling in two different switching positions, wherein the switchable coupling is provided for selectively arresting a damper component.
Figure 2B:
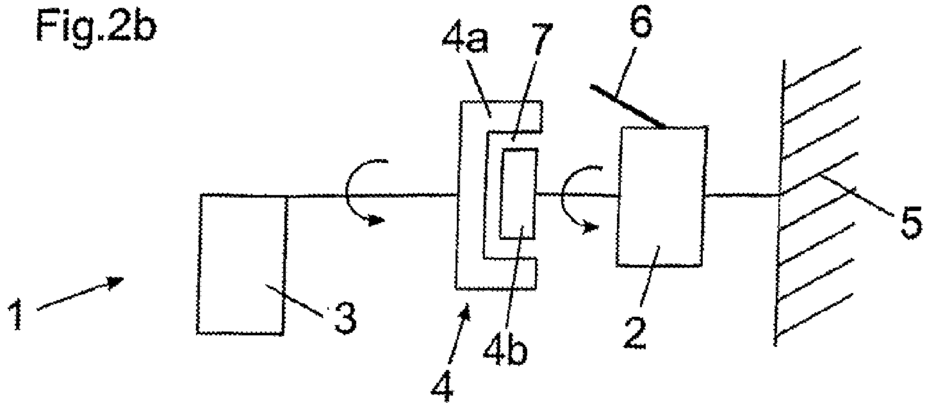

FIG. 2*a* and FIG. 2*b* show highly diagrammatic views of a second variant of the invention. In this case, the damping device 1 also includes an actuating element 3 which can be acted upon by a furniture part (not shown) or by a part of a furniture fitting. In contrast to FIG. 1*a* and FIG. 1*b* the actuating element 3—at least during the damping stroke—is operatively connected to a damping component 4*a* of the damper 4. A movement of the actuating element 3 into the position shown in the dotted line therefore also leads to a movement of the damping component 4*a*. In the illustrated embodiment, the damper 4 is in the form of a rotational damper with two damping components 4*a*, 4*b* which are rotatable relative to each other. A damping fluid 7 (for example a silicone oil or a damping medium of high viscosity) is operative between those two damping components 4*a*, 4*b*. What is essential is that the switchable coupling 2 with the switching member 6 is operative between the second damping component 4*b* and a—preferably stationary—structure 5. In FIG. 2*a*, the switching member 6 is in a switching position in which the switchable coupling 2 arrests the second component 4*b*, as is shown by the illustrated cross between the second damping component 4*b* and the switchable coupling 2. When therefore the first damping component 4*a* is moved by a movement of the actuating element 3, that involves a relative movement between the first damping component 4*a* and the arrested second damping component 4*b*. During that movement, shearing forces act on the damping medium 7, and they produce a dampened movement of the first damping component 4*a* (and thus the actuating element 3). In FIG. 2*b* in contrast, the switching member 6 is in a switching position which does not cause a damping action on the part of the actuating element 3. In that switching position of the switching member 6, the second damping component 4*b* of the damper 4 is not arrested by the coupling 2. When now a movement of the actuating element 3 is transmitted to the first damping component 4*a*, that movement is also transmitted by way of the viscous damping medium 7 to the second damping component 4*b*, whereby the second damping component 4*b* also moves with the first damping component 4*a* by virtue of the acting damping medium. Therefore in FIG. 2*b*, the two damping components 4*a*, 4*b* remain in their relative position with respect to each other. As in that case, no relative movement of the two damping components 4*a*, 4*b* takes place, there is also no damping action generated by the damper 4. The actuating element 3 can admittedly move within predetermined limits in FIG. 2*b*, but it will be appreciated that that movement is not dampened.

Figure 3A:
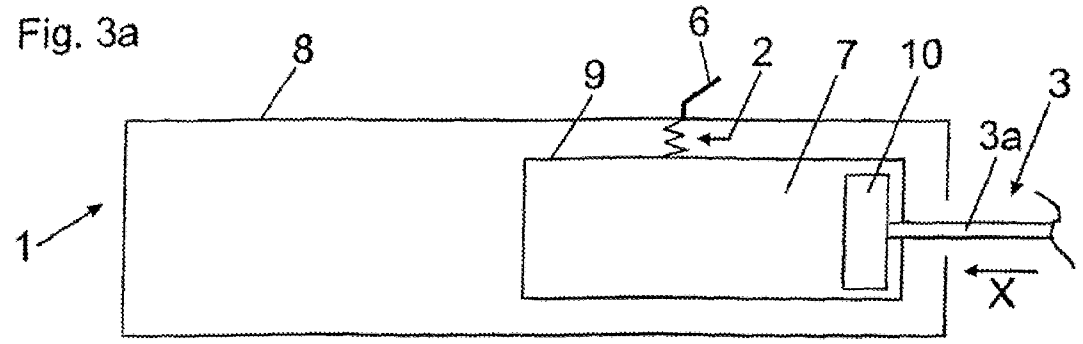
FIGS. 3*a*, 3*b* show diagrammatic views of a linear damper with a closed switchable coupling at the beginning and at the end of the damping stroke.
Figure 3B:
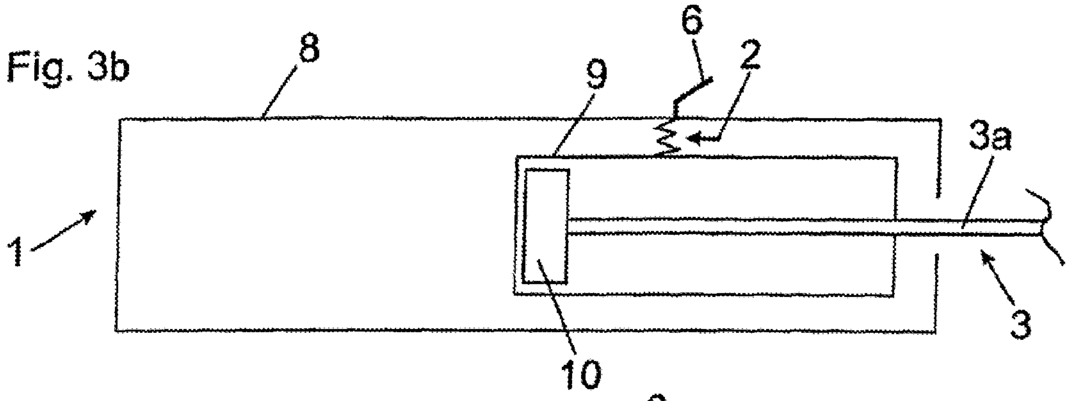

FIG. 3*a* and FIG. 3*b* are highly diagrammatic views showing an embodiment having a linear damper. The damping device 1 comprises a housing 8 in which a cylinder 9 of the linear damper is arranged movably—in particularslidably. A piston 10 is mounted slidably within the cylinder 9 in a per se known manner. In the illustrated embodiment, the actuating element 3 is in the form of a piston rod 3*a*. A switchable coupling 2 having a switching member 6, whereby the cylinder 9 can be arrested relative to the housing 8, is only diagrammatically indicated. The arrested position of the cylinder 9 is shown in FIG. 3*a*. When now the actuating element 3 in the form of the piston rod 3*a* is pushed in, in the direction of the illustrated arrow X, by a furniture part or by a furniture fitting during the damping stroke, then the movement of the piston 10 is braked by the presence of a damping fluid 7 in the interior of the cylinder 9. There can therefore be a dampened movement of the piston rod 3*a* to the end position of the piston 10 as shown in FIG. 3*b*.

Figure 4A:
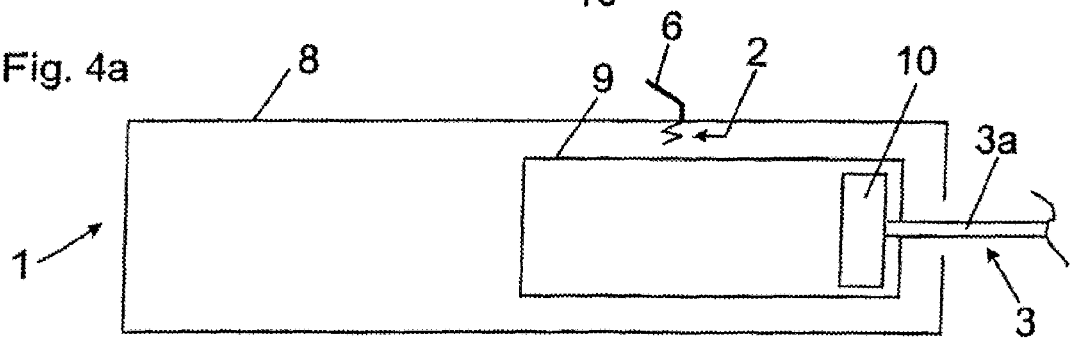
FIGS. 4*a*, 4*b* show diagrammatic views of a linear damper with the switchable coupling being open, wherein the damping function of the damper is deactivated.
Figure 4B:
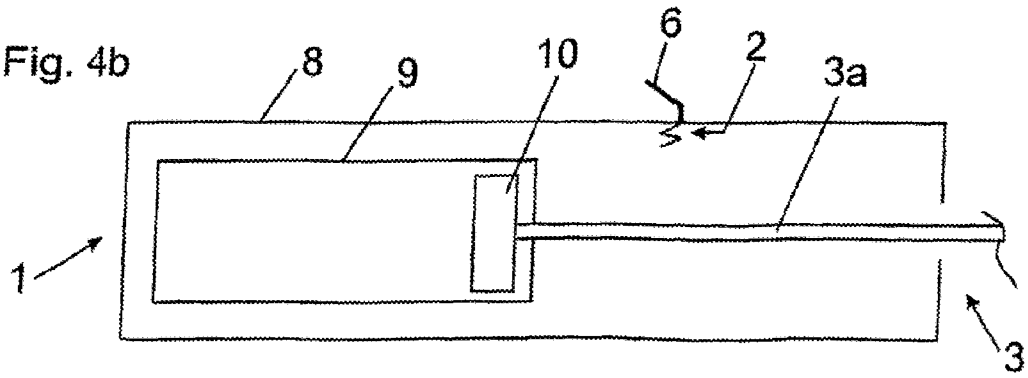

FIG. 4*a*, in contrast, shows that the switching member 6 of the switchable coupling 2 has been moved into a second switching position, whereby the arresting action between the housing 8 and the cylinder 9 has been removed. Accordingly, cylinder 9 is substantially freely slidable within the housing 8. When now starting from FIG. 4*a*, the actuating element 3 in the form of the piston rod 3*a* is acted upon by a force so that the cylinder 9 can be pushed entirely into the housing 8, without in that situation the relative position of the piston 10 in relation to the cylinder 9 substantially changing. The movement of the piston rod 3*a* with released coupling 2 as shown in FIG. 4*b* therefore takes place in a substantially unbraked fashion.

Figure 5A:
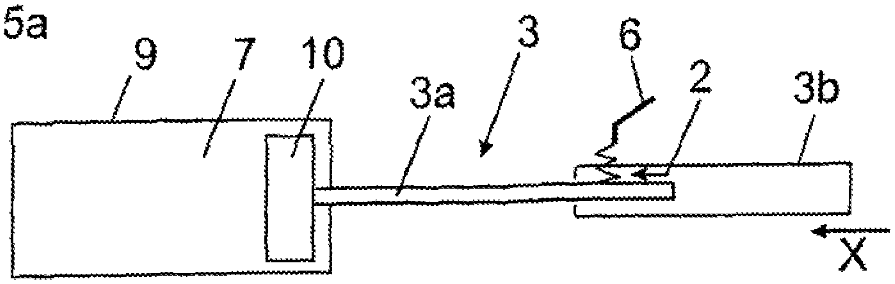
FIGS. 5*a*, 5*b* show an embodiment of a linear damper with a closed coupling operative between two parts of the piston rod.
Figure 5B:
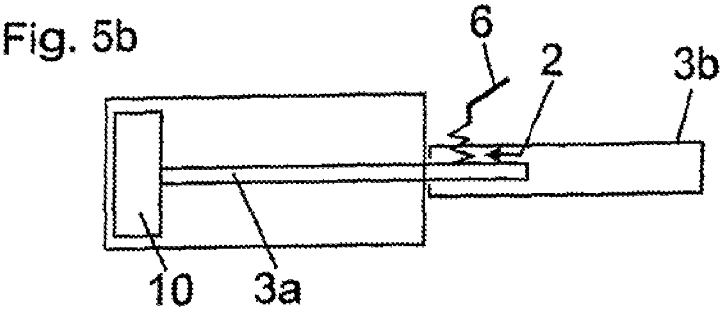

FIG. 5*a* and FIG. 5*b* show a further embodiment of a damping device 1 according to the invention. The damper 4 is in the form of a linear damper comprising a cylinder 9 and a piston 10 slidable therein. In the illustrated embodiment, the actuating element 3 is in the form of a piston rod having two parts 3*a* and 3*b* being movable relative to each other. A diagrammatically illustrated coupling 2 is operative between the two parts 3*a* and 3*b* of the piston rod. FIG. 5*a* shows the coupled condition of the coupling 2 in which the two parts 3*a* and 3*b* of the piston rod are held non-slidably relative to each other. A movement initiated in the direction X is therefore dampened, in which case the piston 10 is movable in the cylinder 9 to the end position shown in FIG. 5*b*.

Figure 6A:
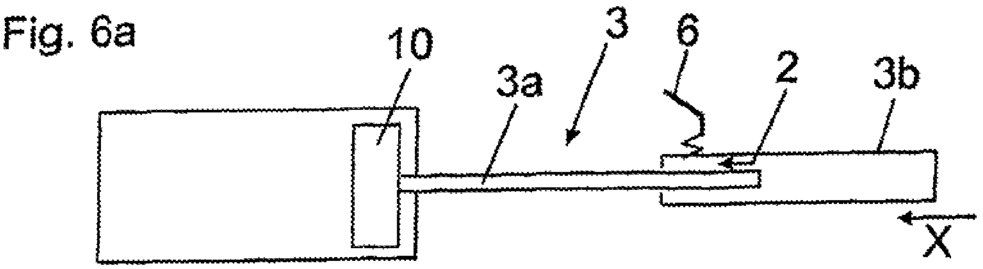
FIGS. 6*a*, 6*b* show the embodiment of FIGS. 5*a* and 5*b* with the coupling released.
Figure 6B:
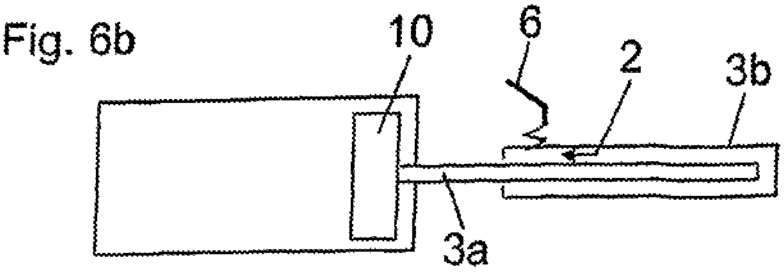

FIG. 6*a* and FIG. 6*b* show the embodiment of FIG. 5*a* and FIG. 5*b* with an open coupling 2. In that switching position of the coupling 2, the two parts 3*a* and 3*b* of the piston rod are displaceable relative to each other in the case of a movement initiated in the direction X. When therefore a movable furniture part or a furniture fitting acts on the piston rod in the direction X, then only the two parts 3*a* and 3*b* are displaced relative to each other. Accordingly, the position of the piston 10 relative to the cylinder 9 remains substantially unchanged by virtue of the fluid pressure in the cylinder 9, wherein there is also no damping of the introduced movement. An embodiment of the coupling 2 provides that the two parts 3*a*, 3*b* are movable—preferable pivotally connected—relative to each other. By way of example in that respect, it is possible to provide a structure in which, in a first rotational position of the part 3*b* relative to the part 3*a*, it is possible to provide a closed coupling with parts 3*a* and 3*b* which are immovable relative to each other. In a second rotational position of the part 3*b* relative to the part 3*a* (which differs from the first rotational position), it is possible in contrast to provide an open coupling 2 which allows an axial movement of the two parts 3*a*, 3*b*. As also in all other embodiments, the switching member 9 can be either in the form of a separate part of the damping device 1 or also in the form of an integral part of the damping components or the actuating element 3 (in the present case integrally with one of the two parts 3*a*, 3*b* of the piston rod).

Figure 7:
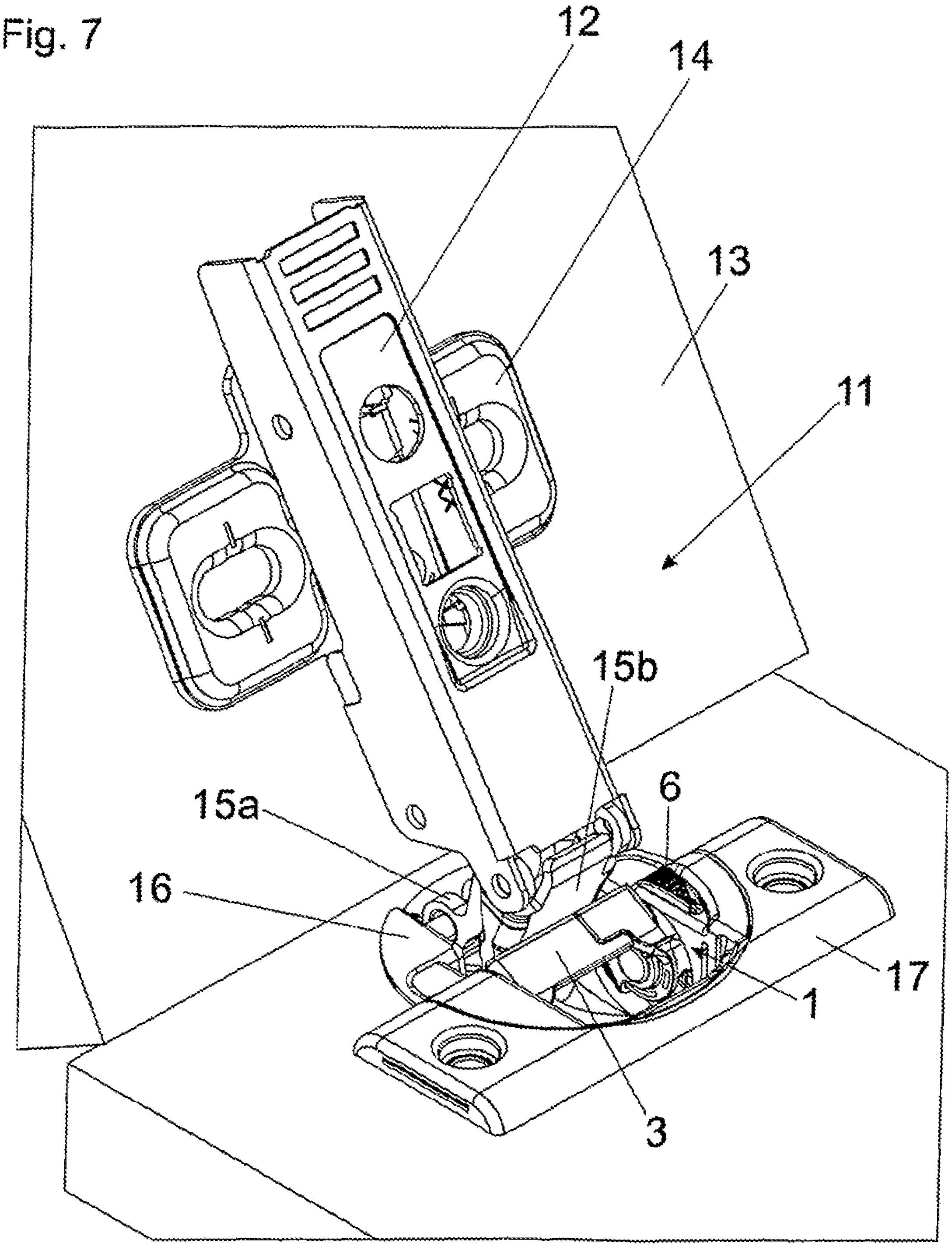
FIG. 7 shows a possible embodiment of a furniture hinge with a damping device according to the invention.

FIG. 7 shows a specific possible embodiment by means of a furniture hinge 11. The furniture hinge 11 includes in a per se known manner a hinge arm 12 which can be releasably clipped to a base plate 14 to be secured to the furniture carcass 13. The hinge arm 12 is coupled to a hinge cup 16 by way of an inner hinge lever 15*a* and an outer hinge lever 15*b*. Arranged at the hinge cup 16 is a flange 17, and a damping device 1 is disposed under the flange 17 and at a lateral outside wall of the hinge cup 16. In the illustrated embodiment, the damping device 1 is in the form of a rotational damper having an actuating element 3. The actuating element 3 is supported rotatably relative to the hinge cup 16 and in the course of the closing movement of the furniture hinge 11, is acted upon by the outer hinge lever 15*b* as from a given relative position of the furniture hinge 11. The rotatable actuating element 3 can therefore be pushed into the hinge cup 16 by the outer hinge lever 15*b* during the damping stroke movement, in which case that movement can take place, in accordance with the aspect of the present invention, selectively in a dampened or undampened fashion. That is made possible by a switching member 6 which can be actuated manually and which in the illustrated embodiment is in the form of a displaceable switch having two switching positions. The switching member 6 is arranged, for example, on the hinge cup 16, but an arrangement on the hinge arm 12 is equally possible. The damping device 1 can also be arranged on the hinge arm 12.

Figure 8A:
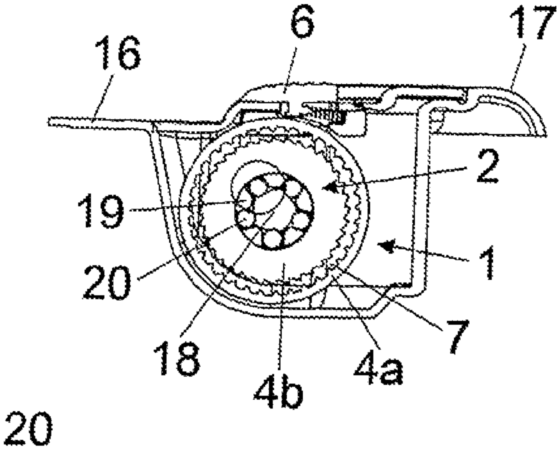
FIGS. 8*a*, 8*b* show sectional views of the damping device with the coupling released, whereby the damping function is deactivated.
Figure 8B:
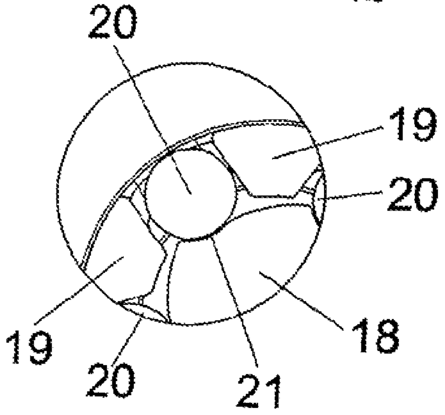

FIG. 8*a* and FIG. 8*b* show a vertical section through the hinge cup 16 of FIG. 7, at the damper side. A damping device 1 is secured to the lateral outside wall of the hinge cup 16 and beneath the flange 17, the damping device 1 being in the form of a rotational damper. The damping device 1 includes a first damping component 4*a* in the form of an annular part. The actuating element 3 shown in FIG. 7 is non-rotatably connected to the first damping component 4*a* so that the first damping component 4*a* moves with the actuating element 3. In addition the damping device 1 includes a second damping component 4*b* arranged coaxially with the first damping component 4*a*. The first damping component 4*a* and the second damping component 4*b* as well as the actuating element 3 are therefore movable about a common axis of rotation. Between the two damping components 4*a*, 4*b* there is an annular free space for accommodating a damping medium 7. The damping components 4*a*, 4*b* have tooth arrangements directed towards each other to increase the shearing forces acting on the damping medium 7. It is also possible to see a holding portion 18 which is in the form of a central rigid projection. The holding portion 18 can also equally be formed by a housing portion of the damping device 1. Arranged around the peripheral edge of the central holding portion 18 are coupling elements 20 which are spaced by a cage 19 and which can be in the form of balls, rolls or cylindrical rollers. The coupling elements 20 can be seen as having round shapes in this vertical section, while the portions of the cage 19 form substantially trapezoidal shapes. The function of the coupling element 20—depending on the respective switching position of the actuating member 6—is to produce a clamping connection between the inner damping component 4*b* and the rigid projection-shaped holding portion 18.

The region circled in FIG. 8*a* is shown on an enlarged scale in FIG. 8*b*, and FIGS. 8*a* and 8*b* do not involve any arresting of the inner damping component 4*b*. When the actuating element 3 shown in FIG. 7 is acted upon, the outer damping component 4*a* which is non-rotatably connected to the actuating element 3 is also rotated, wherein the inner damping component 4*b* is rotated by way of the viscous damping medium 7, by the open coupling 2. Therefore FIGS. 8*a* and 8*b* do not involve any relative movement between the outer damping component 4*b* and the inner damping component 4*a*, and so there is also no dampened movement of the actuating element 3. It is possible to see in FIG. 8*b* the central holding portion 18, around the peripheral edge of which there are recesses 21 for receiving the coupling element 20. In FIG. 8*b* the coupling elements 20 are disposed in those recesses 21 so that there is not a force-locking connection between the rigid holding portion 18 and the inner damping component 4*b*.

Figure 9A:
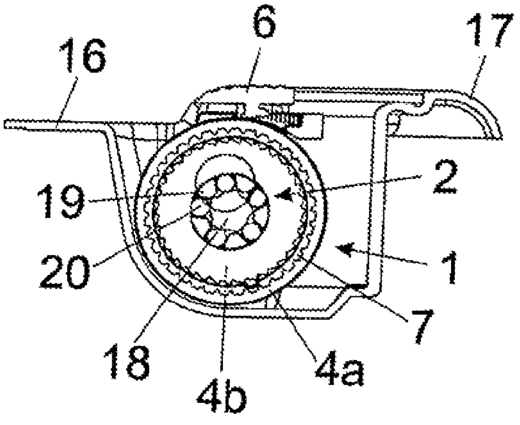
FIGS. 9*a*, 9*b* show sectional views of the damping device with the coupling closed, wherein a damping function is performed by the damper.
Figure 9B:
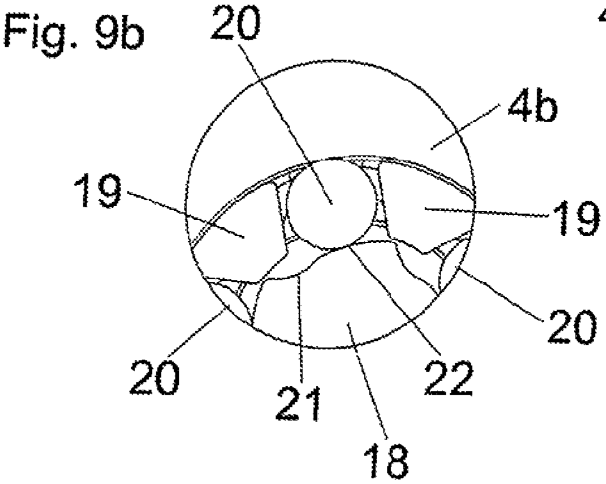

FIG. 9*a* and FIG. 9*b* in contrast show the coupled position of the coupling elements 20. Due to displacement of the switching member 6 the cage 19 was rotated by way of a transmission mechanism in the clockwise direction—preferably within an angular range of between 0° and 30°. A transmission mechanism which cannot be seen in greater detail here therefore converts a linear movement of the switching member 6 into a rotary movement of the cage 19. A detail view on an enlarged scale of the region circled in FIG. 9*a* is shown in FIG. 9*b*. It is possible to see a relative position of the cage 19 with respect to the central holding portion 18, that is altered in relation to FIG. 8*b*, so that now the coupling elements 20 come to bear against inclined surfaces 22 on the holding portion 18. Thus, the coupling elements 20 are connected in force-locking relationship both to the holding portion 18 and also to the inner damping component 4*b*. In that way, therefore, the inner damping component 4*b* is arrested relative to the rigid holding portion 18. When now a movement is initiated by way of the actuating element 3 shown in FIG. 7, the outer damping component 4*a* again moves with the actuating element 3. As however the inner damping component 4*b* is arrested shearing forces act on the damping medium 7 so that the outer damping component 4*a* (and therewith the actuating element 3) is damped.

Figure 10A:
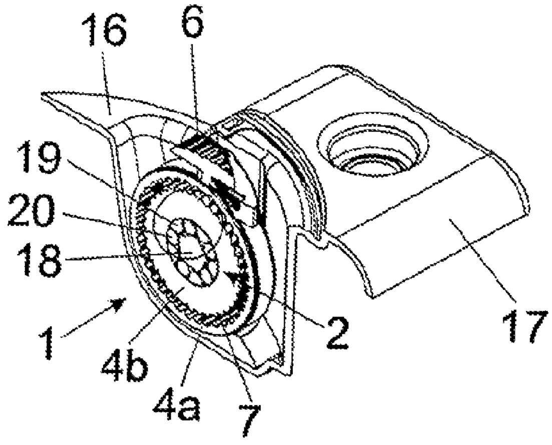
FIGS. 10*a*, 10*b* show perspective sectional views of the damping device with a closed coupling, whereby a damping function is effected.
Figure 10B:
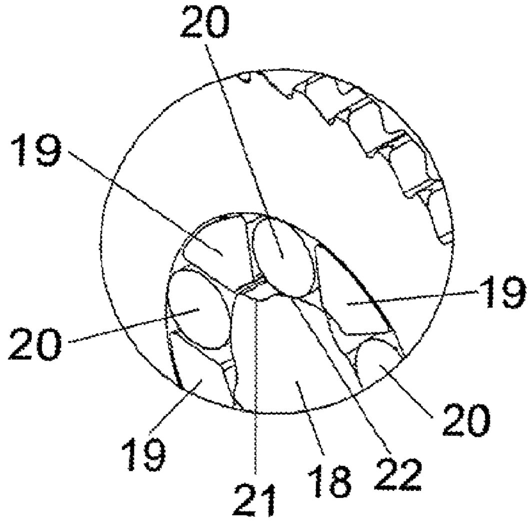

FIG. 10*a* and FIG. 10*b* show views of the clamping position—similarly to FIGS. 9*a* and 9*b*—but as a perspective view. It is possible to see the damping device 1 with the two mutually rotatable damping components 4*a*, 4*b* and the switchable coupling 2 with the switching member 6. A damping medium 7 is operative between the damping components 4*a*, 4*b*. FIG. 10*b* shows a view on an enlarged scale of the circle shown in FIG. 10*a*. It is possible to see the central holding portion 18 with its tooth arrangements 21 arranged thereon and its inclined surfaces 22. Arranged around the holding portion 18 are a plurality of coupling elements 20 which as shown in FIGS. 10*a* and 10*b* are wedged between the inclined surfaces 22 of the holding portion 18 and the inner damping component 4*b* so that there is a damping action on the part of the damping device 1.

Figure 11A:
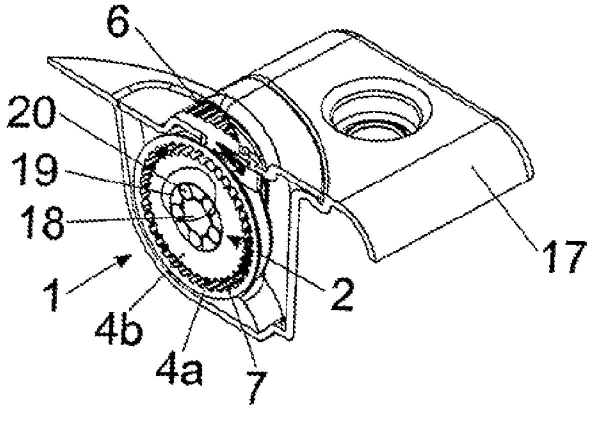
FIGS. 11*a*, 11*b* show perspective sectional views of the damping device with an open coupling, whereby the damping function is deactivated.
Figure 11B:
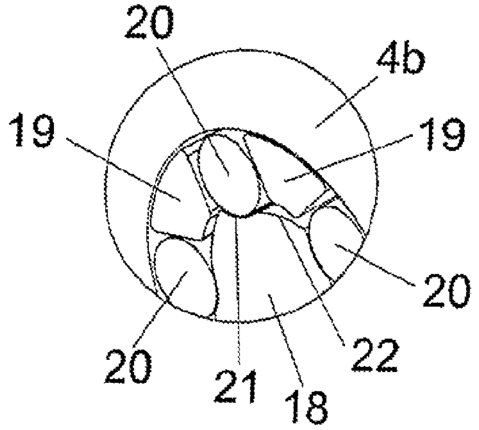

In FIGS. 11*a* and 11*b*, in contrast, the coupling elements 20 are within the recesses 21 in the holding portion 18 so that the inner damping component 4*b* is not arrested in relation to the holding portion 18. Upon a movement of the outer damping component 4*a*, therefore the inner damping component 4*b* can also be rotated, in which case the damping components 4*a*, 4*b* remain in their relative position with respect to each other so that the movement of the actuating element 3 is not damped.

Figure 12:
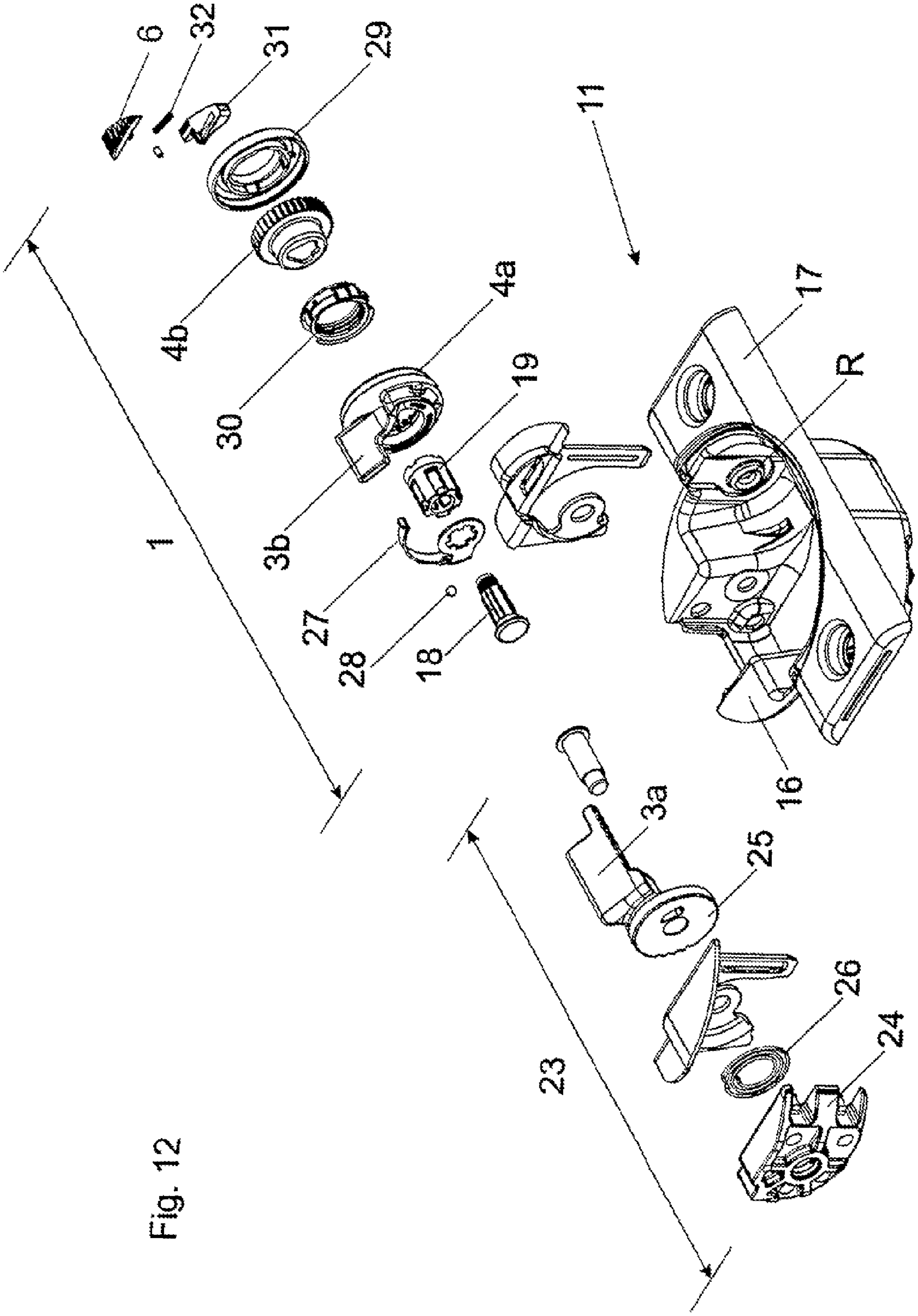
FIG. 12 shows an exploded view of a furniture hinge having a damping device and a return mechanism for the actuating element.

FIG. 12 shows an exploded view of the embodiment of the furniture hinge 11. Reference 23 generally identifies a return mechanism by which the actuating element 3 of the damping device 1 is movable after damping has occurred into a starting position for the next damping stroke again (preferably being movable back again). In the illustrated embodiment, the actuating element 3 has a two-part structure and includes the two parts 3*a* and 3*b* to be connected together. The return mechanism 23 includes a stationary return housing 24 in which a rotor 25 is rotatably supported, with the part 3*a* of the actuating element 3. A return spring 26 in the form of a torsion spring is operative between the stationary return housing 24 and the rotatable rotor 25, the return spring 26 being loaded up during the damping stroke and subsequently thereto rotating the actuating element 3 back into a starting position for the next damping stroke again. The return mechanism 23 for ordinary return of the actuating element 3 after damping has been effected is only shown by way of example and can be replaced by numerous alternative structures.

The damping device 1 in contrast includes the preferably stationary holding portion 18 with the recesses 21 thereon and inclined surfaces 22 (FIG. 10*b*). Fitted on around the holding portion 18 is the cage 19 which is provided for supporting and spacing the coupling elements 20 (not shown here). The part 3*b* of the actuating element 3, that can be connected to the part 3*a*, includes the outer damping component 4*a*. It is also possible to see the inner damping component 4*b* which depending on the respective switching position of the switching member 6 can be selectively couplable to the holding portion 18. A loop-shaped part 27 forming the transmission mechanism between the switching member 6 and the cage 19 is on the one hand pushed on to the cage 19 and on the other hand is coupled with its free end to the switching member 6. It is also possible to see a closure element 28 which prevents the damping medium 7 from escaping from the damper. A cover 29 forms the outer termination of the damping device 1, a seal 30 being arranged between the inner damping component 4*b* and the cover 29. A switch housing 31 serves for supporting the switch member 6 on the hinge cup 16. There is also a spring 32 by which the cage 19 (and therewith the coupling elements 20) can be biased in the direction of the arresting position so as to ensure direct onset of the damping stroke upon a corresponding actuation of the actuating element 3. The actuating element 3 and the damping components 4*a*, 4*b* are mounted rotatably about a common axis of rotation R. The damping device 1 and the return mechanism 23 are arranged as mutually separate units on oppositely disposed side walls of the hinge cup 16.

The present invention is not limited to the illustrated embodiments and includes or extends to all variants and technical equivalents which can fall within the scope of the claims appended hereto. The positional references adopted in the description such as for example up, down, lateral and so forth are also related to the directly described and illustrated Figure and are to be appropriately transferred to the new position upon a change in position. The proposed damping device 1 can be arranged per se on an article of furniture or furniture part, or can also form part of a furniture fitting.

The invention claimed is:

1. A damping device comprising:

a damper to be located at a first part of an article of furniture, said damper configured to be actuated by a second part of the article of furniture so as to dampen a movement of the first part relative to the second part;

a coupling for activating and deactivating a damping action of said damper, said damper being configured to dampen the relative movement between the first part and the second part during movement of the first part relative to the second part in a damping direction when said coupling is in a closed state, and said damper being configured not to dampen the relative movement between the first part and the second part during movement of the first part relative to the second part in the damping direction when said coupling is in an open state; and a manually actuated switching member connected to said coupling for switching said coupling between the closed state and the open state to thereby activate and deactivate said damper, respectively.

2. The damping device according to claim 1, wherein said damper is configured to:

in a first switching position of said switching member, exert a damping force between the first part and the second part; and in a second switching position of said switching member, not exert a damping force between the first part and the second part.

3. The damping device according to claim 1, further comprising a movable actuating element linked to said damper, the second part of the article of furniture acting on said damper via said movable actuating element, said switchable coupling being arranged between said actuating element and said damper;

wherein said actuating element is motionally coupled to said damper in a first switching position of said switchable coupling, and said actuating element is freely movable independently of said damper in a second switching position of said switchable coupling.

4. The damping device according to claim 1, wherein said damper includes a first damping component and a second damping component supported movably relative to each other in a damping stroke, said coupling being configured to arrest said first damping component in a first switching position of said switching member so that a relative movement takes place between said first damping component and said second damping component in the damping stroke to achieve the damping action; and wherein said coupling is configured to release said first damping component in a second switching position of said switching member so that no relative movement takes place between said first damping component and said second damping component in the damping stroke so that no damping action is achieved.

5. The damping device according to claim 4, wherein said coupling includes a plurality of coupling elements for establishing a clamping connection between said first damping component and a holding portion of said switching member.

6. The damping device according to claim 5, wherein said coupling is configured so that, in the second switching position of said switching member, said coupling elements are movable into a position in which said first damping component does not couple to said holding portion.

7. The damping device according to claim 5, wherein said holding portion is formed by a damper housing or a central projection.

8. The damping device according to claim 5, wherein said holding portion has a peripheral edge and recesses around said peripheral edge for receiving said coupling elements.

9. The damping device according to claim 8, wherein said coupling is configured so that, in the first switching position, said coupling elements bear against inclined surfaces of said holding portion, said coupling elements being connected in a force-locking relationship to said holding portion and to said first damping component in the first switching position.

10. The damping device according to claim 5, wherein said coupling elements are configured to be movable relative to said holding portion within an angular range of between 0° and 30° by actuation of said switching member.

11. The damping device according to claim 5, wherein said coupling further includes a cage, said coupling elements being mounted in or on said cage, said cage being configured to move relative to said holding portion via actuation of said switching member.

12. The damping device according to claim 11, further comprising a spring for biasing said cage toward an arresting position.

13. The damping device according to claim 5, wherein said coupling further includes a cage, said coupling elements being mounted in or on said cage, said cage being configured to move relative to said holding portion via a transmission mechanism actuated by said switching member.

14. The damping device according to claim 13, wherein said transmission mechanism is configured to convert a linear movement of said switching member into a rotary movement of said cage.

15. The damping device according to claim 13, further comprising a spring for biasing said cage toward an arresting position.

16. The damping device according to claim 1, further comprising a return mechanism for moving an actuating element of said damper into a starting position for a subsequent damping stroke.

17. A furniture hinge, a pull-out-guide assembly for drawers or an actuating mechanism for moving an upwardly movable furniture flap including a damping device according to claim 1.

* * * * *